(12) United States Patent
Ringgenberg et al.

(10) Patent No.: US 8,511,907 B2
(45) Date of Patent: Aug. 20, 2013

(54) FIBER OPTIC SPLICE HOUSING AND INTEGRAL DRY MATE CONNECTOR SYSTEM

(75) Inventors: Paul D. Ringgenberg, Frisco, TX (US); Neal G. Skinner, Lewisville, TX (US); John L. Maida, Jr., Houston, TX (US); David O. Johnson, The Woodlands, TX (US)

(73) Assignee: WellDynamics, B.V., Leiderdorp (NL)

( * ) Notice: Subject to any disclaimer, the term of this patent is extended or adjusted under 35 U.S.C. 154(b) by 0 days.

(21) Appl. No.: 13/418,682

(22) Filed: Mar. 13, 2012

(65) Prior Publication Data

US 2012/0170613 A1 Jul. 5, 2012

Related U.S. Application Data

(62) Division of application No. 12/633,333, filed on Dec. 8, 2009, now abandoned, which is a division of application No. 10/873,849, filed on Jun. 22, 2004, now Pat. No. 7,641,395.

(51) Int. Cl.
| | |
|---|---|
| *G02B 6/00* | (2006.01) |
| *G02B 6/34* | (2006.01) |
| *G02B 6/36* | (2006.01) |
| *G02B 6/38* | (2006.01) |
| *G02B 6/255* | (2006.01) |

(52) U.S. Cl.
USPC ............ 385/53; 385/12; 385/13; 385/37; 385/55; 385/56; 385/58; 385/60; 385/70; 385/72; 385/96; 385/135

(58) Field of Classification Search
USPC ............ 385/12, 13, 37, 53, 55, 56, 58, 60, 385/70, 72, 96, 135; 374/161
See application file for complete search history.

(56) References Cited

U.S. PATENT DOCUMENTS

| | | | |
|---|---|---|---|
| 3,315,160 | A | 4/1967 | Goodman |
| 4,080,014 | A | 3/1978 | Riegler et al. |
| 4,080,044 | A | 3/1978 | Gousseau |
| 4,134,455 | A | 1/1979 | Read |
| 4,227,770 | A | 10/1980 | Gunn |
| 4,375,237 | A | 3/1983 | Churchman |
| 4,421,979 | A | 12/1983 | Asawa et al. |

(Continued)

FOREIGN PATENT DOCUMENTS

| | | |
|---|---|---|
| EP | 1448925 B1 | 8/2004 |
| GB | 2277812 A | 11/1994 |

(Continued)

OTHER PUBLICATIONS

European Search Report issued Jul. 2, 2009 for EP Patent Application Serial No. 05784283.3, 5 pages.

(Continued)

*Primary Examiner* — Ryan Lepisto
*Assistant Examiner* — Jerry Belvins
(74) *Attorney, Agent, or Firm* — Smith IP Services, P.C.

(57) ABSTRACT

A fiber optic splice housing and integral dry mate connector system. In a described embodiment, a fiber optic connection system includes optical fiber sections in respective conduit sections. Each of the conduit sections is received in the housing assembly. An optical connection between the optical fiber sections is positioned within the housing assembly.

16 Claims, 7 Drawing Sheets

(56) References Cited

U.S. PATENT DOCUMENTS

| | | | |
|---|---|---|---|
| 4,442,893 A | 4/1984 | Foust |
| 4,483,584 A | 11/1984 | Gresty |
| 4,534,424 A | 8/1985 | Ramsey |
| 4,624,309 A | 11/1986 | Schnatzmeyer |
| 4,666,241 A | 5/1987 | Caron |
| 4,690,212 A | 9/1987 | Termohlen |
| 4,756,595 A | 7/1988 | Braun et al. |
| 4,757,859 A | 7/1988 | Schnatzmeyer |
| 4,784,459 A | 11/1988 | Jenkins |
| 4,824,198 A | 4/1989 | Anderton |
| 4,825,946 A | 5/1989 | Schnatzmeyer |
| 4,828,027 A | 5/1989 | Schnatzmeyer |
| 4,846,269 A | 7/1989 | Schnatzmeyer |
| 4,887,883 A | 12/1989 | Darbut et al. |
| 4,921,438 A | 5/1990 | Godfrey et al. |
| 5,048,610 A | 9/1991 | Ross et al. |
| 5,076,657 A | 12/1991 | Toya et al. |
| 5,187,366 A | 2/1993 | Hopenfeld |
| 5,241,611 A | 8/1993 | Gould |
| 5,243,681 A | 9/1993 | Bowen et al. |
| 5,251,708 A | 10/1993 | Perry et al. |
| 5,396,569 A | 3/1995 | Yanagawa et al. |
| 5,435,351 A | 7/1995 | Head |
| 5,440,665 A | 8/1995 | Ray et al. |
| 5,505,260 A | 4/1996 | Andersen et al. |
| 5,577,925 A | 11/1996 | Schnatzmeyer et al. |
| 5,645,438 A | 7/1997 | Cairns |
| 5,645,483 A | 7/1997 | Cushman |
| 5,684,911 A | 11/1997 | Burgett |
| 5,727,630 A | 3/1998 | Brammer |
| 5,778,978 A | 7/1998 | Crow |
| 5,803,167 A | 9/1998 | Bussear et al. |
| 5,803,187 A | 9/1998 | Javins |
| 5,825,963 A | 10/1998 | Burgett |
| 5,831,156 A | 11/1998 | Mullins |
| 5,947,198 A | 9/1999 | McKee et al. |
| 6,006,828 A | 12/1999 | Kluth et al. |
| 6,017,227 A | 1/2000 | Cairns et al. |
| 6,062,073 A | 5/2000 | Patton et al. |
| 6,125,938 A | 10/2000 | Garcia-Soule et al. |
| 6,152,608 A | 11/2000 | Ghara et al. |
| 6,186,229 B1 | 2/2001 | Martin et al. |
| 6,279,660 B1 | 8/2001 | Hay |
| 6,281,489 B1 | 8/2001 | Tubel et al. |
| 6,302,203 B1 | 10/2001 | Rayssinguier et al. |
| 6,325,146 B1 | 12/2001 | Ringgenberg et al. |
| 6,332,787 B1 | 12/2001 | Barlow et al. |
| 6,349,770 B1 | 2/2002 | Brooks et al. |
| 6,378,610 B2 | 4/2002 | Rayssiguier et al. |
| 6,439,778 B1 | 8/2002 | Cairns |
| 6,464,405 B2 | 10/2002 | Cairns et al. |
| 6,478,091 B1 | 11/2002 | Gano |
| 6,511,010 B1 | 1/2003 | Cooper |
| 6,527,052 B2 | 3/2003 | Riggenberg et al. |
| 6,527,441 B1 | 3/2003 | Cranch et al. |
| 6,531,694 B2 | 3/2003 | Tubel et al. |
| 6,538,779 B1 | 3/2003 | Takeshita et al. |
| 6,568,481 B2 | 5/2003 | Koehler et al. |
| 6,666,274 B2 | 12/2003 | Hughes |
| 6,668,921 B2 | 12/2003 | Koehler et al. |
| 6,684,950 B2 | 2/2004 | Patel |
| 6,685,361 B1 | 2/2004 | Rubino et al. |
| 6,718,138 B1 | 4/2004 | Sugawara |
| 6,725,924 B2 | 4/2004 | Davidson et al. |
| 6,729,398 B2 | 5/2004 | Ringgenberg et al. |
| 6,734,805 B2 | 5/2004 | Johnson |
| 6,736,545 B2 | 5/2004 | Cairns et al. |
| 6,755,253 B2 | 6/2004 | Smith et al. |
| 6,758,271 B1 | 7/2004 | Smith |
| 6,758,272 B2 | 7/2004 | Bixenman et al. |
| 6,766,853 B2 | 7/2004 | Laursen et al. |
| 6,776,636 B1 | 8/2004 | Cameron et al. |
| 6,789,621 B2 | 9/2004 | Wetzel et al. |
| 6,828,547 B2 | 12/2004 | Tubel et al. |
| 6,837,310 B2 | 1/2005 | Martin |
| 6,863,137 B2 | 3/2005 | Terry et al. |
| 6,874,361 B1 | 4/2005 | Meltz et al. |
| 6,888,972 B2 | 5/2005 | Berg et al. |
| 6,930,820 B1 * | 8/2005 | Shooks et al. ............... 359/325 |
| 6,933,491 B2 | 8/2005 | Maida, Jr. |
| 6,951,252 B2 | 10/2005 | Restarick et al. |
| 6,983,796 B2 | 1/2006 | Bayne et al. |
| 7,080,940 B2 | 7/2006 | Gotthold et al. |
| 7,165,892 B2 | 1/2007 | Grigsby et al. |
| 7,191,832 B2 | 3/2007 | Grigsby et al. |
| 7,210,856 B2 | 5/2007 | Ringgenberg |
| 7,222,676 B2 | 5/2007 | Patel et al. |
| 7,226,898 B2 | 6/2007 | Bragulla |
| 7,228,898 B2 | 6/2007 | Grigsby et al. |
| 7,252,437 B2 | 8/2007 | Ringgenberg |
| 7,254,999 B2 | 8/2007 | Bostick, III |
| 7,556,093 B2 | 7/2009 | Grigsby et al. |
| 7,594,763 B2 | 9/2009 | Richards et al. |
| 7,641,395 B2 | 1/2010 | Ringgenberg et al. |
| 7,938,178 B2 | 5/2011 | Ringgenberg et al. |
| 2002/0007970 A1 | 1/2002 | Terry et al. |
| 2002/0014340 A1 | 2/2002 | Johnson |
| 2002/0121373 A1 | 9/2002 | Patel |
| 2002/0125008 A1 | 9/2002 | Wetzel et al. |
| 2002/0162666 A1 | 11/2002 | Koehler et al. |
| 2002/0196993 A1 | 12/2002 | Schroeder |
| 2003/0066643 A1 | 4/2003 | Ringgenberg et al. |
| 2003/0077043 A1 | 4/2003 | Hamm et al. |
| 2003/0081917 A1 | 5/2003 | Bussear |
| 2003/0098064 A1 | 5/2003 | Kohli et al. |
| 2003/0131990 A1 | 7/2003 | Tubel et al. |
| 2003/0141075 A1 | 7/2003 | Bixenman et al. |
| 2003/0173077 A1 | 9/2003 | Smith et al. |
| 2003/0192708 A1 | 10/2003 | Koehler et al. |
| 2003/0196820 A1 | 10/2003 | Patel |
| 2003/0213598 A1 | 11/2003 | Hughes |
| 2003/0219190 A1 * | 11/2003 | Pruett ............................. 385/12 |
| 2004/0013391 A1 | 1/2004 | Joseph, II |
| 2004/0028342 A1 | 2/2004 | Jones et al. |
| 2004/0065439 A1 | 4/2004 | Tubel et al. |
| 2004/0067002 A1 | 4/2004 | Berg et al. |
| 2004/0173350 A1 | 9/2004 | Wetzel et al. |
| 2004/0202401 A1 | 10/2004 | Berg et al. |
| 2004/0256127 A1 | 12/2004 | Brenner et al. |
| 2004/0256137 A1 | 12/2004 | Bertini et al. |
| 2005/0072564 A1 | 4/2005 | Grigsby et al. |
| 2005/0074196 A1 | 4/2005 | Grigsby et al. |
| 2005/0074210 A1 | 4/2005 | Grigsby et al. |
| 2005/0092501 A1 | 5/2005 | Chavers et al. |
| 2005/0109518 A1 | 5/2005 | Blacklaw |
| 2005/0207711 A1 | 9/2005 | Vo et al. |
| 2005/0213897 A1 | 9/2005 | Palmer et al. |
| 2006/0153487 A1 | 7/2006 | McLellan et al. |
| 2010/0086257 A1 | 4/2010 | Ringgenberg et al. |
| 2012/0148204 A1 | 6/2012 | Ringgenberg et al. |
| 2012/0170614 A1 | 7/2012 | Ringgenberg et al. |
| 2012/0170893 A1 | 7/2012 | Ringgenberg et al. |
| 2012/0170898 A1 | 7/2012 | Ringgenberg et al. |
| 2012/0174378 A1 | 7/2012 | Ringgenberg et al. |

FOREIGN PATENT DOCUMENTS

| | | |
|---|---|---|
| GB | 2318379 A | 4/1998 |
| GB | 2318397 A | 4/1998 |
| WO | 86/02173 A1 | 4/1986 |
| WO | 8602173 A1 | 4/1986 |
| WO | 03/046428 A1 | 6/2003 |
| WO | 03046428 A1 | 6/2003 |
| WO | 2005/054801 A1 | 6/2005 |
| WO | 2005054801 A1 | 6/2005 |

OTHER PUBLICATIONS

Indian Search Report issued Dec. 15, 2011 for IN Patent Application Serial No. 7767/DELNP/2006: 1 pages.

Halliburton; "DTS Conceptual Completions" presentation by Tommy Grigsby, dated Dec. 3, 2002.

Office Action issued Jan. 13, 2006 for U.S. Appl. No. 10/680,440, 11 pages.

Office Action issued Jul. 5, 2006 for U.S. Appl. No. 10/680,440, 6 pages.
Office Action issued Mar. 14, 2006 for U.S. Appl. No. 10/790,908, 12 pages.
Office Action issued Mar. 22, 2006 for U.S. Appl. No. 10/828,085, 9 pages.
Office Action issued Mar. 26, 2007 for U.S. Appl. No. 10/873,849, 12 pages.
Office Action issued May 30, 2005 for U.S. Appl. No. 10/873,849, 13 pages.
Office Action issued Sep. 11, 2006 for U.S. Appl. No. 10/873,849, 12 pages.
Office Action issued Nov. 24, 2008 for U.S. Appl. No. 10/873,849, 13 pages.
Office Action issued Feb. 14, 2006 for U.S. Appl. No. 11/038,369, 10 pages.
Office Action issued Jul. 11, 2006 for U.S. Appl. No. 11/038,369, 10 pages
Office Action issued Aug. 9, 2007 for U.S. Appl. No. 11/560,724, 23 pages.
Office Action issued Sep. 20, 2012 for U.S. Appl. No. 13/418,674, 43 pages.
Office Action issued Jun. 11, 2004 for U.S. Appl. No. 10/680,053, 13 pages.
Office Action issued Jan. 26, 2005 for U.S. Appl. No. 10/680,625, 14 pages.
India Examination Report issued Dec. 15, 2011 for IN Patent Application No. 7767/DELNP/2006, 1 page.
Focal Technologies Corporation Product Brochure for Fiber Optic Rotary Joint Model 286, Apr. 15, 2003, 2 pages.
Grigsby, Tommy, Halliburton presentation entitled "'Development Status' Fiber Optic Compatible Downhole Completion Equipment," Jun. 22-24, 2004, 17 paes, London, England.
Halliburton, "DTS Conceptual Completions," undated, 5 pages.
Halliburton presentation entitled "Greater Plutonio Completions Workshop," Mar. 12, 2003, 28 pages, BP Staines, UK.
Halliburton Drawing No. 42 oo 210, Title "4 ½ Communication Tool," Apr. 7, 2001, 3 pages.
Otis Engineering Drawing No. 41UP58701, Title "5.875 Type 'UP' Running Tool," May 4, 1993, 1 page.
Search Report issued May 5, 2005, for UK application GB0507890.2, 2 pages.
Search Report issued Jun. 18, 2007, for UK application GB0507890.2, 2 pages.
Further Search Report and Examination Report issued Jan. 15, 2008, for UK application GB0507890.2, 2 pages.
International Search Report and Written Opinion issued Aug. 17, 2005, for International Patent Application Serial No. PCT/US04/01856, 9 pages.
International Search Report and Written Opinion issued Oct. 5, 2004, for International Patent Application Serial No. PCT/US04/01857, 7 pages.
International Search Report and Written Opinion issued Jul. 26, 2005, for International Patent Application Serial No. PCT/US04/01863, 7 pages.
International Preliminary Report on Patentability issued Apr. 20, 2006, for International Patent Application Serial No. PCT/US04/01856, 9 pages.
International Preliminary Report on Patentability issued Apr. 20, 2006, for International Patent Application Serial No. PCT/US04/01857, 7 pages.
International Preliminary Report on Patentability issued Apr. 20, 2006, for International Patent Application Serial No. PCT/US04/01863, 5 pages.
Halliburton "X-Line® and R-Line® Landing Nipples and Lock Mandrels—Set and Lock Reliability in Subsurface Flow Control Equipment with a Total Completion Package," Mar. 1997, 8 pages.
Intelligent Wells, "Optical Fiber Technology—An Introduction to the Fundamentals," Intelligent Wells, Oct. 2002, pp. 4-6.
Kargas, T.K., Zisk, Jr., E.J., Makin, G.D., and Bostick, F.X., "Oil Field Applications of HydrOptics™ Technology," Intelligent Wells, Oct. 2002, pp. 8-13.

Bybee, Karen, "Development of HP/HT Fiber-Optic Connectors for Subsea Intelligent Wells," Journal of Petroleum Technology Offshore Completions, Aug. 2003, pp. 48-49.
NorfolkWire & Electronics, Optical Fiber Splice Protectors—FSP product brochure, 2003, 1 page.
Ocean Design, Inc., NRH (Nautilus Rolling-Seal Hybrid) Connector product brochure, 2000, 2 pages.
Jenkins, Dave, "Underwater Mateable Connectors: Enabling Technology and the Next Step in Performance for Navy and Telecom Applications," Ocean Design, Inc., presented at Underwater Intervention Conference, 2002, 7 pages.
Ocean Design, Inc., Hybrid Wet-Mate product brochure, 2000, 2 pages
Ocean Design, Inc., I-CONN Wet-Mateable Optical Connector product brochure, 2000, 2 pages.
Ocean Design, Inc., "Ocean Design Introduces New I-CONN Product Line," Jul. 22, 2002, 7 pages.
Wright, Perry, Barlow, Steward, and Brees, Anton, "The Development and Application of HT/HP Fiber-Optic Connectors for Use on Subsea Intelligent Wells," OTC 15323, May 5-8, 2003, 7 pages, Houston, Texas.
Romanisko, Tom, and Wright, Perry, "Extending Tieback Distances: Wet-Mate Connectors, Enabling Technologies for Critical Systems Developments," OTC 13235, Apr. 30-May 3, 2001, 8 pages, Houston, Texas.
PES, A Halliburton company, "Model FO Fibre Optic Orientating Disconnect Head," Oct. 23, 2000, 7 pages.
Ramnath, L., Dacosta, S., Akong, S., Hassanali, H., Omonze, D., Powers, J.T., "Pioneering Fibre Optic Completion Installation in the Mahogany Field, Offshore Trinidad," undated, 20 pages.
Kunkel, Bill, "Intelligent Completions," Production Optimization, undated, 1 page.
Wright, Perry, "Optical Fiber and Connectors: Critical for Future Subsea Systems," Sea Technology, undated, 4 pages.
Cairns, James, "Hybrid Wet-Mate Connectors: 'Writing the Next Chapter,'" Sea Technology, Jul. 1997, 4 pages.
Barlow, Stewart, "The Ruggedization of Hybrid Wet-Mate Connectors," Sea Technology, Jul. 2000, 3 pages.
Seacon® Advanced Products data sheets, Apr. 2004, 21 pages.
Seacon® Fiber Optic Connectors product brochures, undated, 6 pages.
Seacon® MicroStar, 4-channel, Wet-Mate, Optical Connector product brochure, undated, 3 pages.
Tolan, M., Boyle, M., and Williams, G., "The Use of Fiber-Optic Distributed Temperature Sensing and Remote Hydraulically Operated Interval Control Valves for the Management of Water Production in the Douglas Field," SPE 71676, Sep. 30-Oct. 3, 2001, 13 pages, New Orleans, Louisiana.
Lanier, G.H., Brown, G., and Adams, L., "Brunei Field Trial of a Fibre Optic Disributed Temperature Sensor (DTS) System in a 1,000m Open Hole Horizontal Oil Producer," SPE 84324, Oct. 5-8, 2003, 6 pages, Denver, Colorado.
Tronic, Ironic Fibre Optic Wellhead Feedthrough Connectors product brochure, undated, 2 pages.
Tronic, FireFly Project, Underwater Mateable Electro-Optic Connector product brochure, undated, 2 pages.
Jenkins, Dave, "Underwater Mateable Connectors in the Military and Telecom Sectors," UnderWater Magazine, Sep./Oct. 2002, 2 pages.
Ferguson, Stuart, and Makin, Graham, "Intelligent Well Completion: The Next Steps," W Magazine, Sep. 2002, 3 pages.
Makin, Graham D., "Intelligent Well Briefing—HydrOptics™ Production & Reservoir Optimization Revolutionized," Weatherford, May 14, 2003, 18 pages.
Erlandsen, Sigurd, Vold, Gisle, and Makin, Graham D., "World's First Multiple Fiber-Optic Intelligent Well," World Oil, Mar. 2003, pp. 29-32, Gulf Publishing Company, USA.
Examination Report issued Oct. 15, 2010 for European Patent Application Serial No. 05 784 283.3, 5 pages.
Search Report issued Mar. 8, 2006 for International Application Serial No. PCT/US05/19314, 3 pages.
Written Opinion issued Mar. 8, 2006 for International Application Serial No. PCT/US05/19314, 4 pages.

Office Action issued Dec. 17, 2010 for U.S. Appl. No. 12/633,333, 32 pages.
Office Action issued May 31, 2011 for U.S. Appl. No. 12/633,333, 10 pages.
Office Action issued Nov. 10, 2011 for U.S. Appl. No. 12/633,333, 16 pages.
Office Action issued Dec. 12, 2012 for U.S. Appl. No. 13/418,674, 18 pages.
OTIS Engineering Drawing No. 41UP58701, dated May 4, 1993, 1 page.
Halliburton Energy Services Drawing No. 42 oo 210, dated Apr. 7, 2001, 3 pages.
International Search Report issued Jul. 26, 2005 for PCT Patent Application No. PCT/US04/01863, 3 pages.
International Search Report issued Aug. 17, 2005 for PCT Patent Application No. PCT/USO4/01856, 2 pages.
Weatherford; "Intelligent Well Completion: the next steps", W Magazine article, dated Sep. 2002, 3 pages.
Intelegent Wells; "Optical Fiber Technology", company article, dated Oct. 2002, 9 pages.
Focal Technologies Corporation; "Model 286", product description, 700-0134-00, Issue 1, dated Apr. 15, 2003, 2 pages.
Norfolkwire & Electronics; online product listing of the "Optical Fiber Splice Protectors—FSP", "Mechanical Splice Holder", and "Port Cutting Tool", dated 2003, 1 page.
Ocean Design, Inc.; "ODI News and Information", company brochure, dated Jul. 22, 2002, 7 pages.
Ocean Design, Inc.; "Underwater Mateable Connectors: Enabling Technology and the Next Step in Performance for Navy and Telecom Applications", informational paper, retrieved Mar. 12, 2012, 7 pages.
Ocean Design, Inc.; "NRH Connector", product overview, dated 2000, 4 pages.
Ocean Design, Inc.; "I-CONN" product overview, dated 2000, 2 pages.
Offshore Completions; "Development of HP/HT Fiber-Optic Connectors for Subsea Intelligent Wells", magazine article pp. 48-49, dated Aug. 2003, 2 pages.
Office Action issued Mar. 8, 2005 for U.S. Appl. No. 10/680,053, 9 pages.
Office Action issued Jun. 11, 2004 for U.S. Appl. No. 10/680,053, 17 pages.
Office Action issued Jul. 6, 2005 for U.S. Appl. No. 10/680,053, 9 pages.
Office Action issued Oct. 21, 2005 for U.S. Appl. No. 10/680,053, 12 pages.
Office Action issued Nov. 8, 2004 for U.S. Appl. No. 10/680,053, 9 pages.
Office Action issued Jul. 5, 2006 for U.S. Appl. No. 10/680,440, 11 pages.
Office Action issued Jan. 26, 2005 for U.S. Appl. No. 10/680,625, 7 pages.
Office Action issued Mar. 9, 2006 for U.S. Appl. No. 10/680,625, 15 pages.
Office Action issued Jun. 27, 2005 for U.S. Appl. No. 10/680,625, 6 pages.
Office Action issued Mar. 14, 2006 for U.S. Appl. No. 10/790,908, 33 pages.
Office Action issued Mar. 22, 2006 for U.S. Appl. No. 10/828,085, 29 pages.
Office Action issued May 5, 2006 for U.S. Appl. No. 10/873,849, 11 pages.
Office Action issued May 30, 2008 for U.S. Appl. No. 10/873,849, 12 pages.
Office Action issued Sep. 12, 2007 for U.S. Appl. No. 10/873,849, 12 pages.
Office Action issued Feb. 14, 2006 for U.S. Appl. No. 11/038,369, 23 pages.
Office Action issued Jul. 11, 2006 for U.S. Appl. No. 11/038,369, 14 pages.
Office Action issued Aug. 9, 2007 for U.S. Appl. No. 11/056,724, 23 pages.
Halliburton; "DTS conceptual completions", undated, received Mar. 15, 2012, 31 pages.

Focal Technologies Corporation; "Model 286", product article 700-0134-00, Issue 1, dated Apr. 15, 2003, 2 pages.
GB Search Report issued May 9, 2005 for GB Patent Application No. GB0507890.2, 2 pages.
Halliburton Drawing No. 42 oo 210, dated Apr. 7, 2001, 3 pages.
Bill Kunkel; "Intelligent completions", product optimization, undated, received Mar. 15, 2012, 1 page.
W Magazine; "Intelligent Well Completion: the next steps" magazine article, dated Sep. 2002, 3 pages.
Intelligent Wells; "Oil field Applications of HydrOptics Technology", pp. 8-13, dated Oct. 2002, 6 pages.
International Preliminary Report on Patentability issued Apr. 10, 2006 for PCT Patent Application No. PCT/US04/001856, 1 page.
International Preliminary Report on Patentability issued Apr. 10, 2006 for PCT Patent Application No. PCT/US04/001857, 1 page.
International Preliminary Report on Patentability issued Apr. 10, 2006 for PCT Patent Application No. PCT/US04/001863, 1 page.
International Search Report issued Aug. 15, 2005 for PCT Patent Application No. PCT/US04/001856, 2 pages.
International Search Report issued Oct. 5, 2004 for PCT Patent Application No. PCT/US04/001857, 2 pages.
International Search Report issued Jul. 26, 2005 for PCT Patent Application No. PCT/US04/001863, 3 pages.
Norfolkwire & Electronics; "Optical Fiber Splice Protectors—FSP", product webpage, dated 2003, 1 page.
Dave Jenkins; "Underwater Mateable Connectors: Enabling Technology and the Next Step in Performance for Navy and Telecom Applications", informational paper, undated, received Mar. 15, 2012, 7 pages.
Ocean Design, Inc.; "ODI News and Information", company news brochure, dated Jul. 22, 2002, 7 pages.
Karen Bybee, Offshore Technology Conference; "Development of HP/HT Fiber-Optic Connectors for Subsea Intelligent Wells", Article for the Offshore Technology Conference on May 5-8, pp. 48-49, dated Aug. 2003, 2 pages.
Lawrence Ramnath, et al.; "Pioneering Fibre Optic Completion Installation in the Mahogany Field, Offshore Trinidad", BP Trinidad Energy Company paper, dated Sep. 19, 2002, 20 pages.
Offshore Technology Conference; "Extending Tieback Distances: Wet-Mate Connectors, Enabling Technologies for Critical Systems Developments", OTC 13235, dated Apr. 30-May 3, 2001, 8 pages.
Offshore Technology Conference; "The Development and Application of HT/HP Fiber-Optic Connectors for Use on Subsea Intelligent Wells", OTC 15323, dated May 5-8, 2003, 7 pages.
OTIS Drawing No. 41UP58701, "Running Tool", dated May 4, 1993, 1 page.
PES; "Model FO Fibre Optic Orientating Disconnect Head", marketing document, Oct. 23, 2000, 7 pages.
Seacon Advanced Products; "MicroStar, 4-channel, Wet-Mate, Optical Connector: Currently Under Development", product overview, undated, received Mar. 15, 2012, 3 pages.
Seacon Advanced Products; "Optical & Electrical Wet-Mate Connectors & Penetrators", product data sheet, pp. 22-1-22-20 (REV0304), Apr. 2004, 21 pages.
Sea Technology; "Hybrid Wet-Mate Connectors: 'Writing the Next Chapter'", magazine article, dated Jul. 1997, 4 pages.
Sea Technology; "Deck Gear, Cable & Power Systems", magazine article, dated Jul. 2000, 7 pages.
Society of Petroleum Engineering; "The Use of Fiber-Optic Distributed Temperature Sensing and remote Hydraulically Operated Interval Control Valves for the Management of Water Production in the Douglas Field", SPE 71676, dated Sep. 30-Oct. 3, 2001, 13 pages.
Society of Petroleum Engineering; "Brunei Field Trial of a Fibre Optic Distributed Temperature Sensor (DTS) System in a 1,000m Open Hole Horizontal Oil Producer", SPE 84324, dated Oct. 5-8, 2003, 6 pages.
Sigurd Eriandsen, et al; "Special Focus: Intelligent Wells/Completions", magazine article, dated 2003, 1 page.
Tronic; "Tronic Fibre Optic Wellhead Feedthrough Connectors", Seacon article, undated, received Mar. 15, 2012, 8 pages.
Underwater Magazine; "Underwater Mateable Connectors in the Military and Telecom Sectors", magazine article, dated Sep./Oct. 2002, 2 pages.

Weatherford; "Intelligent Well Briefing", company presentation, dated May 14, 2003, 18 pages.
Office Action issued Jun. 13, 2013 for U.S. Appl. No. 13/418,674, 59 pages.
Office Action issued Nov. 8, 2004 for U.S. Appl. No. 10/680,053, 12 pages.
Office Action issued Jul. 6, 2005 for U.S. Appl. No. 10/680,053, 23 pages.
Office Action issued Jan. 26, 2005 for U.S. Appl. No. 10/680,053, 14 pages.
Office Action issued Jun. 27, 2005 for U.S. Appl. No. 10/680,053, 6 pages.
Office Action issued Oct. 26, 2004 for U.S. Appl. No. 10/680,053, 5 pages.
Ramnath, Lawrence, et al.; "Pioneering Fibre Optic Completion Installation in the Mahogany Field, Offshore Trinidad", article, dated Sep. 19, 2002, 20 pages.
Office Action issued May 28, 2013 for U.S. Appl. No. 13/401,955, 97 pages.
Halliburton; "Greater Plutonio Completions Workshop", company presentation, dated Mar. 12, 2003, 27 pages.
Otis Drawing of "5.875 Type 'UP' Running Tool", dated Sep. 27, 2005, 4 pages.
Norfolkwire & Electronics; "Optical Fiber Splice Protectors—FSP", "Mechanical Splice Holder", and "Port Cutting Tool", company product website, dated 2003, 1 page.
Office Action issued Oct. 21, 2005 for U.S. Appl. No. 10/680,053, 10 pages.
Office Action issued Jan. 13, 2006 for U.S. Appl. No. 10/680,053, 11 pages.
Halliburton; "'Development Status': Fiber Optic Compatible Downhole Completion Equipment", BP FiberFest presentation, dated Jun. 22-24, 2004, 17 pages.
Halliburton; "DTS conceptual Completions", company article, dated 2003, 5 pages.
Halliburton; "Greater Plutonio Completions Workshop" Completion Options presentation, dated Mar. 12, 2003, 27 pages.
PES; "Model FO Fibre Optic Orientating Disconnect Head", Marketing Document, Size 9647, Product No. 296FO0, dated Oct. 23, 2000, 7 pages.
Seacon; "MicroStar, 4-channel, Wet-Mate, Optical Connector", Product data sheet, dated Apr. 20 2002, 3 pages.
Seacon; "Fiber Optic Connectors", Product data sheet, 20-1 (REV 0304), received Mar. 14, 2012, 6 pages.
Seacon Advanced Products; company data sheet, (22-1)-(22-20) REV 0304, APD-DS-0007 S-Series REV 4 dated Apr. 2004, 21 pages.
Sea Technology; "World Wide Information Leader for Marine Business, Science & Engineering", reprint magazine, dated Jul. 2000, 7 pages.
Sea Technology; "Hybrid Wet-Mate Connectors: 'Writing the Next Chapter'", reprint magazine, dated Jul. 1997, 4 pages.
Society of Petroleum Engineers; "The Use of Fiber-Optic Distributed Temperature Sensing and Remote Hydraulically Operated Interval Control Valves for the Management of Water Production in the Douglas Field", SPE 71676, dated Sep. 30-Oct. 3, 2001, 13 pages.
Society of Petroleum Engineers; "Brunei Field Trial of a Fibre Optic Distributed Temperature Sensor (DTS) System in a 1,000 Open Hole Horizontal Oil Producer", SPE 84324, dated Oct. 5-8, 2003, 6 pages.
Tronic; "Tronic Fibre Optic Wellhead Feedthrough Connectors", company data sheet, received Mar. 14, 2012, 2 pages.
Tronic; "FireFly Project", company data sheet, received Mar. 14, 2012, 2 pages.
Weatherford; "Intelligent Well Briefing: HydrOptics, Production & Reservoir Optimization Revolutionized", company presentation, dated May 14, 2003, 18 pages.
World Oil; "World's first multiple fiber-optic intelligent well", magazine reprint, Mar. 2003 issue, pp. 29-32, dated Mar. 2003, 4 pages.
Halliburton; "X-Line and R-Line Landing Nipples and Lock Mandrels", product data sheet, CPP5628R, dated Mar. 1997, 8 pages.
Written Opinion issued Aug. 17, 2005 for PCT Patent Application No. PCT/US04/01856, 7 pages.
Written Opinion issued Oct. 5, 2004 for PCT Patent Application No. PCT/US04/01857, 6 pages.
Written Opinion issued Jul. 26, 2005 for PCT Patent Application No. PCT/US04/01863, 3 pages.
World Oil; "World's first multiple fiber-optic intelligent well", Mar. 2003 issue, pp. 29-32, 3 pages.
Halliburton; "X-Line and R-Line Landing Nipples and Lock Mandrels", issue CPP5628R, dated Mar. 1997, 8 pages.
Office Action issued Feb. 1, 2013 for U.S. Appl. No. 13/418,705, 62 pages.
Advisory Action issued Mar. 1, 2013 for U.S. Appl. No. 13/418,674, 4 pages.

* cited by examiner

FIBER OPTIC SPLICE HOUSING AND INTEGRAL DRY MATE CONNECTOR SYSTEM

CROSS-REFERENCE TO RELATED APPLICATION(S)

This application is a division of U.S. application Ser. No. 12/633,333 filed on 8 Dec. 2009, which is a division of prior application Ser. No. 10/873,849 filed on Jun. 22, 2004, now issued U.S. Pat. No. 7,641,395. The entire disclosures of these prior applications are incorporated herein by this reference.

BACKGROUND

The present invention relates generally to operations performed and equipment utilized in conjunction with subterranean wells and, in an embodiment described herein, more particularly provides a fiber optic splice housing and integral dry mate connector system.

Optical connections between sections of optical fiber can be used in well completions, such as gravel pack completions. Unfortunately, each optical connection will result in some optical transmission loss. For this reason, the use of optical connections should be minimized, or avoided, if possible.

While running a completion string into a well, with an optical fiber in a conduit strapped to the completion string, a mishap may cause the conduit and/or the optical fiber to become damaged. If a considerable length of the conduit has already been run into the well when the damage occurs, then this may be a situation in which it would be preferable to use an optical connection between sections of the optical fiber, with the resultant optical transmission loss, rather than go to the expense of pulling the considerable length of conduit out of the well and replacing it.

Where an optical distributed temperature sensing system includes an optical connection between sections of optical fiber, the optical connection also results in an effective "blinding" of the system to temperature determinations in a significant length of the optical fiber below the optical connection. Therefore, it would be desirable to be able to store the significant length of the optical fiber below the optical connection in a convenient location downhole, so that the inability of the system to sense temperature in this length of optical fiber would not impair the system's ability to sense temperature along an interval in the well.

Typical optical distributed temperature sensing systems use estimations of a characteristic of an optical fiber known as "differential attenuation" in calculating temperature along the optical fiber based on optical signals returned by the optical fiber. It would be desirable to be able to directly determine a value for the differential attenuation of an optical fiber downhole, or to calibrate a distributed temperature sensing system by adjusting the value of differential attenuation used by the system in calculating temperature, in order to accurately calibrate the system.

Furthermore, it would be desirable to provide improved optical connections and connection systems which will reduce the optical transmission loss due to such connections, enhance the convenience in making such connections, increase the reliability of such connections, etc.

SUMMARY

In carrying out the principles of the present invention, in accordance with one of multiple embodiments described below, improved optical connections and connection systems are provided. Methods are also provided for calibrating distributed temperature sensing systems, and for storing substantial lengths of optical fiber downhole.

In one aspect of the invention, a fiber optic connection system is provided which includes optical fiber sections in respective conduit sections. Each of the conduit sections is received in the housing assembly. An optical connection between the optical fiber sections is positioned within the housing assembly.

In another aspect of the invention, a method of optically connecting optical fiber sections to each other is provided. The method includes the steps of: positioning each of the optical fiber sections within a respective conduit section; optically connecting the optical fiber sections to each other using an optical connection; and containing the connection within a housing assembly.

In yet another aspect of the invention, a fiber optic connection apparatus is provided which includes optical fiber sections in respective conduit sections. Each of the conduit sections is received in a respective one of opposite ends of a housing assembly, so that the housing assembly is reciprocably displaceable over the conduit sections. An optical connection is formed between the optical fiber sections.

A fiber optic connection is provided by the present invention. The fiber optic connection includes a fiber optic connector having an optical fiber section therein. A conduit is attached to the fiber optic connector, with the optical fiber section extending through the conduit. In another aspect of the invention, the fiber optic connector is sealed so that fluid flow through the fiber optic connector is prevented.

An optical fiber storage apparatus is also provided by the present invention. The apparatus includes a generally tubular body having at least one circumferentially extending recess formed thereon. At least one optical fiber section is received in the recess.

In a further aspect of the invention, a method of calibrating an optical distributed temperature sensing system for differential attenuation includes the steps of: positioning an optical fiber in a wellbore; and storing a substantial length of the optical fiber in a storage apparatus in the well, so that the substantial length of the optical fiber is at a same temperature in the well.

In a still further aspect of the invention, an optical distributed temperature sensing system is provided. The system includes an optical fiber extending along an interval, so that portions of the optical fiber are exposed to different temperatures in the interval. A storage apparatus has a substantial length of the optical fiber stored therein, so that the substantial length of the optical fiber is at a same temperature in the storage apparatus.

In another aspect of the invention, the optical distributed temperature sensing system may include a temperature sensing element positioned so that the temperature sensing element is at the same temperature as the substantial length of the first optical fiber. The temperature sensing element may be internal or external to the storage apparatus, independent of the optical fiber, and may be an optical, electrical or mechanical device. The temperature sensing element may be formed on another optical fiber of the apparatus.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
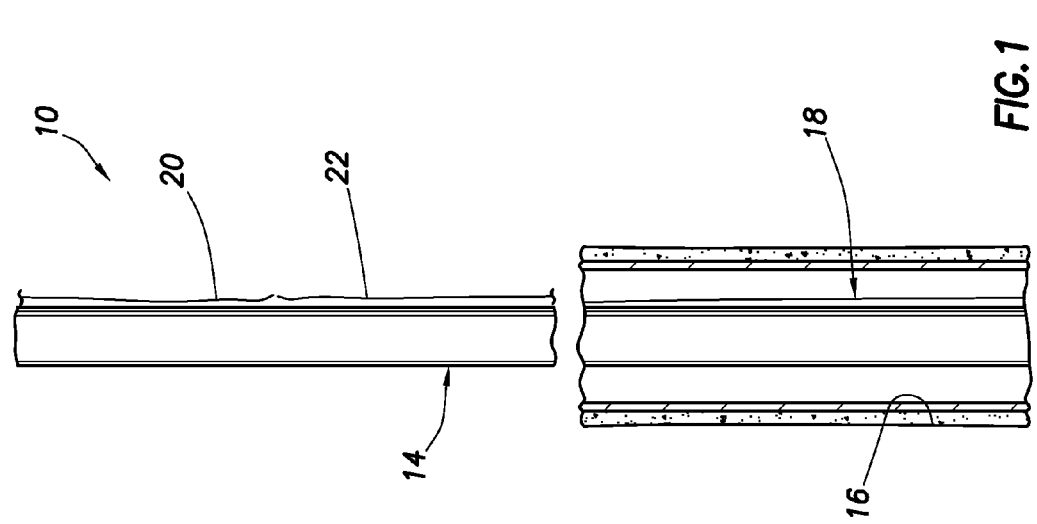
FIG. 1 is a schematic partially cross-sectional view of an application for a fiber optic connection system embodying principles of the present invention.
Figure 2:
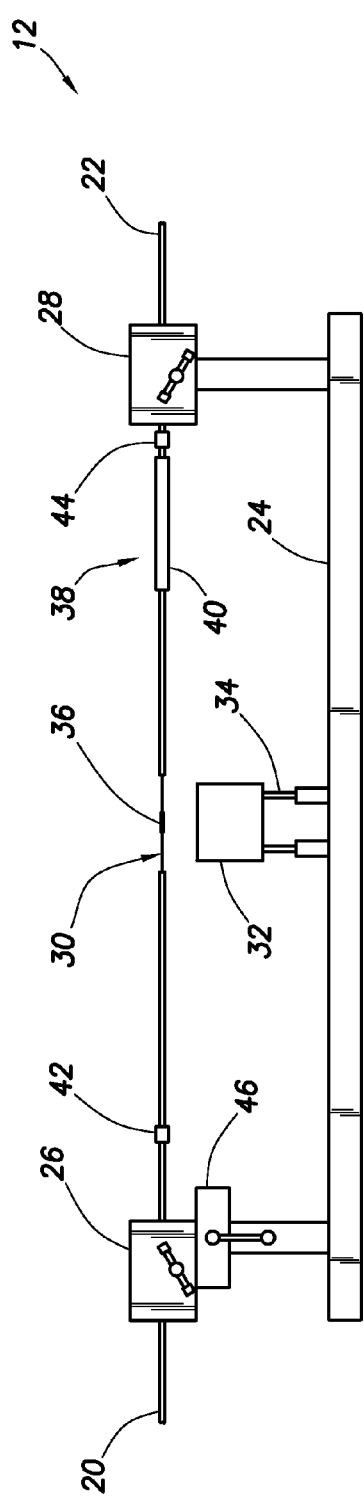
FIG. 2 is an enlarged scale schematic elevational view of the fiber optic connection system usable in the application of FIG. 1, the connection system embodying principles of the present invention.

Representatively illustrated in FIG. 1 is an application 10 for a fiber optic connection system 12 depicted in FIG. 2 which embodies principles of the present invention. In the following description of the system 12 and other apparatus and methods described herein, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which are not limited to any specific details of these embodiments.

As depicted in FIG. 1, a tubular string 14, such as a production tubing string, is being lowered into a wellbore 16. The tubular string 14 has a conduit 18 externally attached thereto, such as by strapping the conduit to the tubular string as it is lowered into the wellbore 16. It should be understood, however, that the principles of the invention are not limited to use with a production tubing string or with conduit strapped externally to a tubing string. The tubular string 14 could instead be a casing, liner, coiled tubing or other type of tubular string, the conduit 18 could be internal to, or in a sidewall of, the tubular string, use of a tubular string or conduit is not required, etc.

In the application 10, the conduit 18 is a tubular string, such as a type known to those skilled in the art as "control line," which typically has a diameter of approximately ¼ inch. At least one, and preferably multiple, optical fiber(s) extend through the conduit 18 for uses such as communication, control, sensing, etc.

Due to a mishap during the lowering of the tubular string 14 into the wellbore 16, the conduit 18 has become damaged, such as by severing the conduit into two separate sections 20, 22. Instead of completely severing the conduit 18, it could be merely crushed or pierced, so that its pressure-holding or -transmitting capability is questionable. The optical fiber(s) within the conduit 18 could also be damaged at the time the conduit 18 is damaged.

If a considerable length of the tubular string 14 and conduit 18 has already been lowered into the wellbore 16 at the time the conduit is damaged, it may be very expensive to pull the tubular string and conduit out of the wellbore, replace the conduit, and run the tubular string and conduit back into the wellbore. Using the principles of the present invention, the decision can be made to instead repair the damaged conduit 18 and/or optical fibers therein by means of the connection system 12 illustrated in FIG. 2.

As representatively illustrated in FIG. 2, the two conduit sections 20, 22 have been removed, at least partially, from the tubular string 14. Preferably, ends of the conduit sections 20, 22 are taken to a work area a safe distance from the rig floor in a non-hazardous environment. The ends of the conduit sections 20, 22 are secured to a work surface 24 (such as a shop table), using clamps, vises or other gripping devices 26, 28.

If an optical fiber 30 within the conduit 18 has been damaged, it will be spliced using a fusion splicer 32. To allow access to the optical fiber 30 by the fusion splicer 32, approximately 12 inches of space may be needed between the ends of the conduit sections 20, 22. The fusion splicer 32 is preferably mounted using a device 34, such as a telescoping or otherwise translating base, which enables the fusion splicer to be smoothly and accurately moved between a position about the optical fiber 30 and intermediate the ends of the conduit sections 20, 22, and a position distanced from the conduit sections as depicted in FIG. 2.

Prior to using the fusion splicer 32 to form a fusion splice connection 36 in the optical fiber 30, a housing assembly 38 is slid over the ends of the conduit sections 20, 22. The housing assembly 38 shown in FIG. 2 includes a generally tubular housing 40 and two gripping and sealing devices 42, 44. Many other configurations of housing assemblies may be used in keeping with the principles of the invention.

The housing assembly 38 is used in the connection system 12 to secure the conduit sections 20, 22 to each other, protect the optical fiber 30 and fusion splice 36 therein, and to isolate the optical fiber and interior of the conduit 18 from well pressure and well fluids. As depicted in FIG. 2, the housing 40 and one of the devices has been installed over the conduit section 22 and displaced to a position near the gripping device 28. The other device 42 has been installed over the conduit section 20 and displaced to a position near the gripping device 26. In these positions, the housing assembly 38 is out of the way of use of the fusion splicer 32.

The fusion splicer 32 can now be displaced by the device 34 to a position in which the optical fiber 30 is received in the fusion splicer, so that the splice 36 can be formed. Note that it is not necessary for the fusion splice 36 to be used, since other types of fiber optic connections can be used in keeping with the principles of the invention. For example, a dry mate type of connection, such as the connection depicted in FIGS. 4-6 and described below, may be used in place of the fusion splice 36. However, the fusion splice 36 is presently preferred, due to its relatively low optical transmission loss.

After the fusion splice 36 is formed in the optical fiber 30, the fusion splicer 32 is displaced back out of the way to allow the housing assembly 38 to be displaced over the splice. At this point, it may be desirable to remove any slack in the optical fiber 30, so that tight radius bends in the optical fiber are avoided. To accomplish this, the gripping device 26 may be displaced away from the other gripping device 28 to thereby increase the distance between the ends of the conduit sections 20, 22. For example, a laterally translating base 46 may be used to displace the gripping device 26 away from the other gripping device 28.

Figure 3:
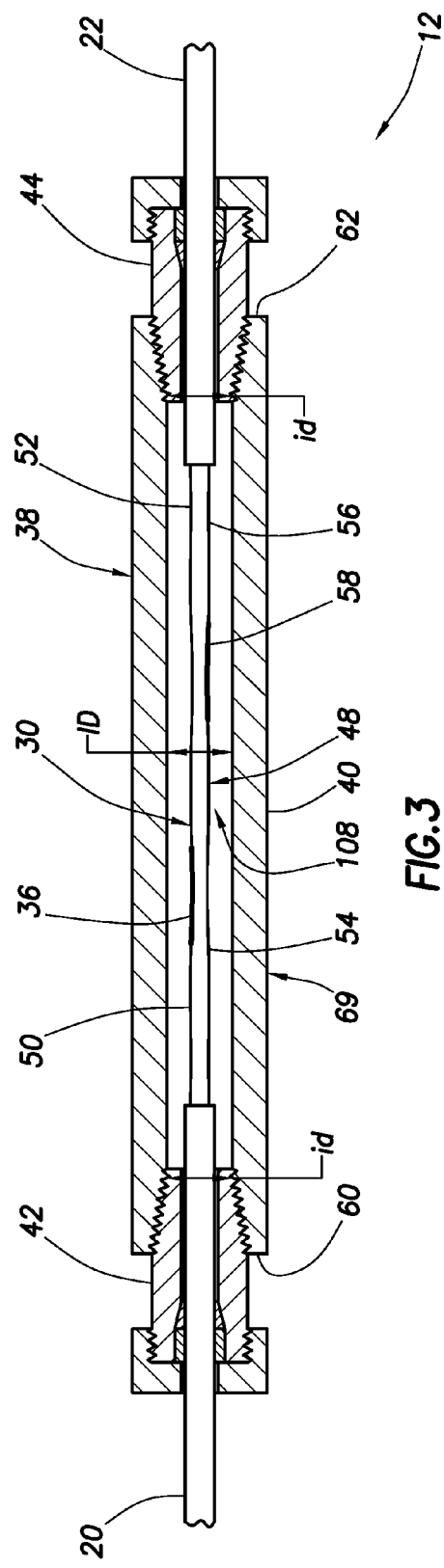
FIG. 3 is a further enlarged scale schematic partially cross-sectional view of a fusion splice fiber optic connection apparatus embodying principles of the present invention.

When the slack in the optical fiber 30 has been removed, the housing 40 is displaced to a position in which the splice 36 is within the housing, and the ends of the conduit sections 20, 22 are received in respective opposite ends of the housing. An enlarged cross-sectional view showing this position is depicted in FIG. 3. In this view, multiple optical fibers 30, 48 are shown extending through the conduit 18, with the splice 36 operatively connecting sections 50, 52 of the optical fiber 30, and another fusion splice 58 operatively connecting sections 54, 56 of the optical fiber 48. Thus, it will be appreciated that multiple optical fibers can be used in a conduit in the connection system 12.

After positioning the housing 40 as shown in FIG. 3, the devices 42, 44 are used to grip the ends of the conduit sections 20, 22 and seal off the interior of the housing. The devices 42, 44 may be conventional tube fittings, for example, of the type sold by Swagelock Company of Solon, Ohio. Alternatively, the devices 42, 44 may be special proprietary fittings, such as FMJ fittings available from WellDynamics, Inc. of Spring, Texas, which fittings utilize multiple metal-to-metal seals to ensure long term reliability in downhole environments.

Preferably, the housing 40 has an internal dimension ID (such as an internal diameter) between its opposite ends 60, 62 which is greater than an internal dimension id (such as an internal diameter) at one or both of the ends. In this manner, the interior of the housing 40 can accommodate deformed ends of the conduit sections 20, 22 (such as may result from damage to the conduit 18) without requiring time-consuming straightening of the ends of the conduit sections received in the housing. The opposite ends 60, 62 of the housing 40 may be reduced in size to form the internal dimensions id by, for example, swaging the ends, cold working, hot forging, or any mechanical deforming process, etc.

The reduced internal dimensions id are preferred for use with the WellDynamics FMJ fittings discussed above. However, it should be understood that the reduced internal dimensions id are not necessary in keeping with the principles of the invention. Furthermore, it is not necessary for both of the opposite ends 60, 62 to have the reduced internal dimensions id. For example, only one of the ends 60, 62 could have the reduced internal dimension id, while the other end could have an internal dimension equal to, or greater than, the internal dimension ID.

The housing assembly 38, conduit sections 20, 22, optical fiber sections 50, 52, 54, 56, and fusion splice connection 108 depicted in FIG. 3 comprise a fiber optic connection apparatus 69 which may also be used in fiber optic connection systems other than the system 12 in keeping with the principles of the invention.

Figure 4:
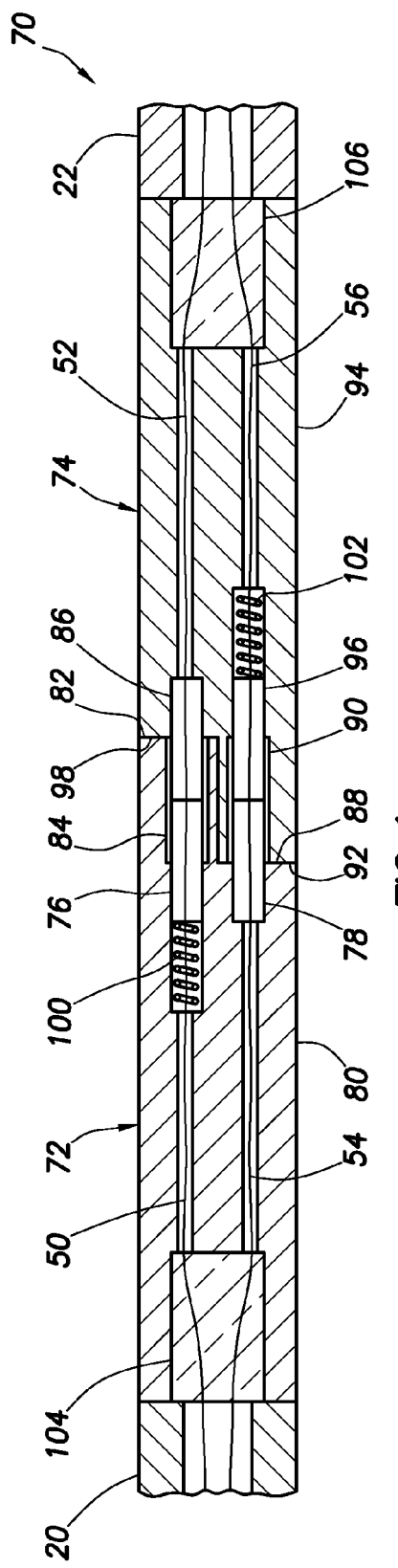
FIG. 4 is a further enlarged scale schematic cross-sectional view of a dry mate fiber optic connection embodying principles of the invention.

Referring additionally now to FIG. 4, another fiber optic connection 70 which may be used in the system 12 is representatively illustrated. The connection 70 could also be used in other systems and/or in other applications, without departing from the principles of the invention. Since some of the elements of the connection 70 are similar to those described above, the same reference numbers are used to indicate these elements in FIG. 4.

Instead of using a fusion splice to join sections of optical fiber, the connection 70 is of the type known to those skilled in the art as a "dry mate" connection. Ends of the optical fiber sections 50, 52 and 54, 56 are precisely aligned, so that light may be transmitted therebetween. For this purpose, the connection 70 includes two fiber optic connectors 72, 74 which, when operatively connected to each other, align the respective optical fiber sections 50, 52 and 54, 56.

The connector 72 has the optical fiber sections 50, 54 extending therein from within the conduit 20 to ferrules 76, 78 positioned in a body 80 of the connector. The optical fiber sections 50, 54 may be attached to the ferrules 76, 78 by, for example, bonding each optical fiber section within the respective ferrule.

The ferrule 76 is recessed inwardly from an end 82 of the body 80 of the connector 72. The ferrule 76 is received in an alignment sleeve 84, which is also recessed in the end 82 of the body 80. However, the ferrule 76 is recessed further than the alignment sleeve 84, so that the alignment sleeve can also receive therein another ferrule 86 of the other connector 74 as described below.

The ferrule 78 extends outwardly from the body 80 at a recessed shoulder 88 formed on the body. The shoulder 88 is recessed inward relative to the end 82 of the body 80. In this manner, the ferrule 78 can be received in another alignment sleeve 90 recessed in an end 92 of a body 94 of the other connector 74.

Another ferrule 96 in the body 94 of the connector 74 is received in the alignment sleeve 90. The ferrule 96 is recessed further into the end 92 of the body 94 than the alignment sleeve 90 to allow insertion of the ferrule 78 into the alignment sleeve. The optical fiber section 56 is attached to the ferrule 96, for example, by being bonded therein. When the ferrules 78, 96 are both received in the alignment sleeve 90, they are precisely aligned with each other, so that the optical fiber sections 54, 56 are also precisely aligned end-to-end, thereby permitting optical transmission therebetween.

The ferrule 86 extends outwardly from the body 94 at a recessed shoulder 98 formed on the body. The shoulder 98 is recessed relative to the end 92 of the body 94. The optical fiber section 52 is attached to the ferrule 86, for example, by bonding the optical fiber section within the ferrule. When the connectors 72, 74 are operatively connected, the ferrule 86 is received in the alignment sleeve 84, which precisely aligns the ferrules 76, 86, thereby precisely aligning the optical fiber sections 50, 52 end-to-end and permitting optical transmission therebetween.

Preferably, the ferrule 86 does not extend outward from the body 94 beyond the end 92, and the ferrule 78 does not extend outward from the body 80 beyond the end 82, so that the ferrules are protected by the ends of the connectors 72, 74 prior to connecting the connectors to each other. More preferably, the ferrules 78, 86 are recessed relative to the respective ends 82, 92 for enhanced protection of the ferrules.

A biasing device 100, such as a coiled compression spring, may be used to bias the ferrule 76 into very close proximity, or actual contact, with the ferrule 86 when the connectors 72, 74 are connected. Similarly, another biasing device 102 may be used to bias the ferrule 96 into very close proximity, or actual contact, with the ferrule 78.

A seal 104 may be used to prevent fluid flow through the body 80 of the connector 72. The seal 104 preferably prevents any well fluid or pressure which might enter the connector 72 from passing into the conduit section 20. The seal 104 could be entirely disposed within the body 80, as depicted in FIG. 4, or it could be partially or entirely disposed within the end of the conduit section 20.

The seal 104 could be a hardenable fluid which is flowed about the optical fiber sections 50, 54 in the body 80, and is then allowed to harden. A material such as epoxy could be used for this purpose. Other materials, such as elastomers, non-elastomers, etc., could be used in addition, or as an alternative. A similar seal 106 may be used in the body 94 of the connector 74 and/or in the end of the conduit section 22 to prevent fluid flow through the body 94, and to prevent passage of well fluid and pressure into the conduit section.

The body 80 may be attached to the end of the conduit section 20 using any of a variety of methods. For example, the body 80 could be welded to the end of the conduit section 20, the body could be threaded into the conduit section, a fastener (such as a pin, dowel, screw, rivet, etc.) could be used to fasten the body to the conduit section, the body could be molded onto or into the end of the conduit section, etc.

Any means of attaching or connecting the body 80 to the conduit section 20 may be used in keeping with the principles of the invention. Preferably, this attachment prevents fluid from flowing between the body 80 and the conduit section 20. The body 94 may be similarly attached to the end of the conduit section 22.

If the bodies 80, 94 are molded parts, then the seals 104, 106 may be formed integrally with the bodies in the molding process. It is not necessary for the seals 104, 106 to be elements separate from the bodies 80, 94 in keeping with the principles of the invention.

Although the connection 70 is depicted in FIG. 4 as being used to connect two pairs of optical fiber sections 50, 52, 54, 56, it should be understood that any number of optical fiber sections may be connected in keeping with the principles of the invention. Three pairs of optical fiber sections may be connected using a connection similar to the connection 70, without exceeding the outer diameter of a conventional control line tubing.

Figure 5:
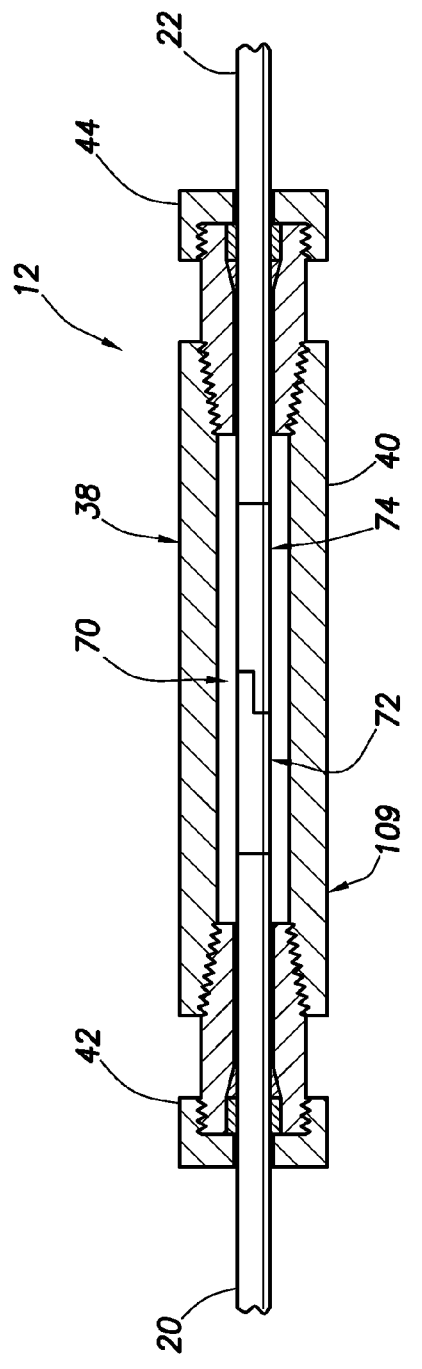
FIG. 5 is a schematic cross-sectional view of the fiber optic connection apparatus of FIG. 3, having the dry mate fiber optic connection of FIG. 4 therein.

Referring additionally now to FIG. 5, the connection is depicted as it may be used in the system 12. The connection 70 is positioned within the housing assembly 38. The devices 42, 44 grip and seal to the respective conduit sections 20, 22 on either side of the connection 70. In this manner, the connection 70 is isolated from well fluids and pressures by the housing assembly 38. If, however, the housing assembly 38 should become damaged or leak, the seals 104, 106 in the connectors 72, 74 will prevent the well fluids and pressures from entering the conduit sections 20, 22.

If the connection 70 is used in the system 12 in place of the fusion splice connection 108 (fusion splices 36, 58) described above, then of course the fusion splicer 32 would not be used. The housing 40 may also be made somewhat shorter, since there is no need to accommodate the fusion splicer 32 between the ends of the conduit sections 20, 22. It is believed that the fusion splice connection 108 would be most suitably used for repairs or otherwise unanticipated connections, whereas the dry mate connection 70 would be most suitably used for pre-planned connections, but either connection could be used in either situation in keeping with the principles of the invention.

The housing assembly 38, conduit sections 20, 22, and dry mate connection 70 depicted in FIG. 5 comprise a fiber optic connection apparatus 109 which may also be used in fiber optic connection systems other than the system 12 in keeping with the principles of the invention.

Figure 6:
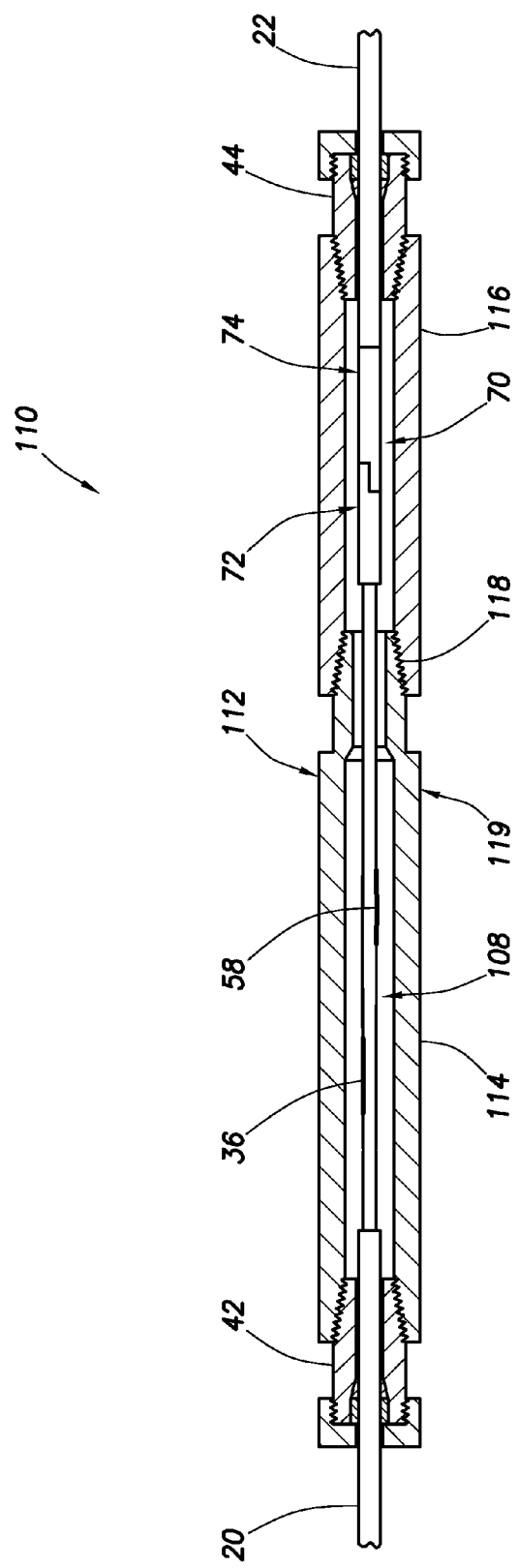
FIG. 6 is a schematic cross-sectional view of another fiber optic connection apparatus having both the dry mate fiber optic connection of FIG. 4 and fusion splice connection of FIG. 3 therein.

Referring additionally now to FIG. 6, another connection system 110 is representatively illustrated. The system 110 is similar in some respects to the system 12 described above, and so elements which are similar to those described above are indicated in FIG. 6 using the same reference numbers.

The system 110 includes both a fusion splice connection 108 and a dry mate connection 70 positioned within a housing assembly 112. Unlike the housing assembly 38 described above, the housing assembly 112 includes multiple generally tubular housings 114, 116. The fusion splice connection 108 is positioned within the housing 114, and the dry mate connection 70 is positioned within the housing 116.

The housings 114, 116 are connected to each other at a pressure-tight connection 118, which may include one or more metal-to-metal seals. The connection 118 could, for example, be configured similar to a WellDynamics FMJ fitting.

The connection system 110 permits the connector 72 of the dry mate connection 70 to be connected to optical fibers in the conduit section 20 in the field. This may be advantageous where a well tool, such as a packer, valve, etc., is supplied to the field with the dry mate connector already installed, and optical fibers in the conduit section 20 are to be connected to optical fibers in the well tool. In that situation, the housing 116 depicted in FIG. 6 may be considered as the well tool having the connector 74 pre-installed therein. The housing 116 could alternatively be attached to the conduit 22 external or internal to a well tool.

To make the optical connection, the housing 116 would be secured, such as by using the device 28 shown in FIG. 2. The connector 72 would be connected to the connector 74. The conduit section 20 would be secured, such as by gripping it with the device 26. The housing 114 and device 42 would be slid over the conduit section 20. The fusion splicer 32 would then be used to form the splices 36, 58 between the optical fibers in the conduit section 20 and the optical fibers in the connector 72. The translating base 46 would be used to displace the device 26 away from the device 28 to remove slack from the optical fibers. The housing 114 would be attached and sealed to the housing 116 at the connection 118. The device 42 would be used to attach and seal the housing 114 to the conduit section 20.

This is similar to the method described above for forming the fusion splice connection 108 in the system 12. A main difference in the system 110 is that the housing 116 and dry mate connection 70 are interposed to one side of the fusion splice connection 108. Note that in the system 110 it is not necessary for the conduit section 22 to be used, since the optical fibers therein could instead terminate in the housing 116, or could be otherwise positioned.

The housing assembly 112, conduit sections 20, 22, dry mate connection 70, and fusion splice connection 108 depicted in FIG. 6 comprise a fiber optic connection apparatus 119 which may also be used in fiber optic connection systems other than the system 110 in keeping with the principles of the invention.

Figure 7:
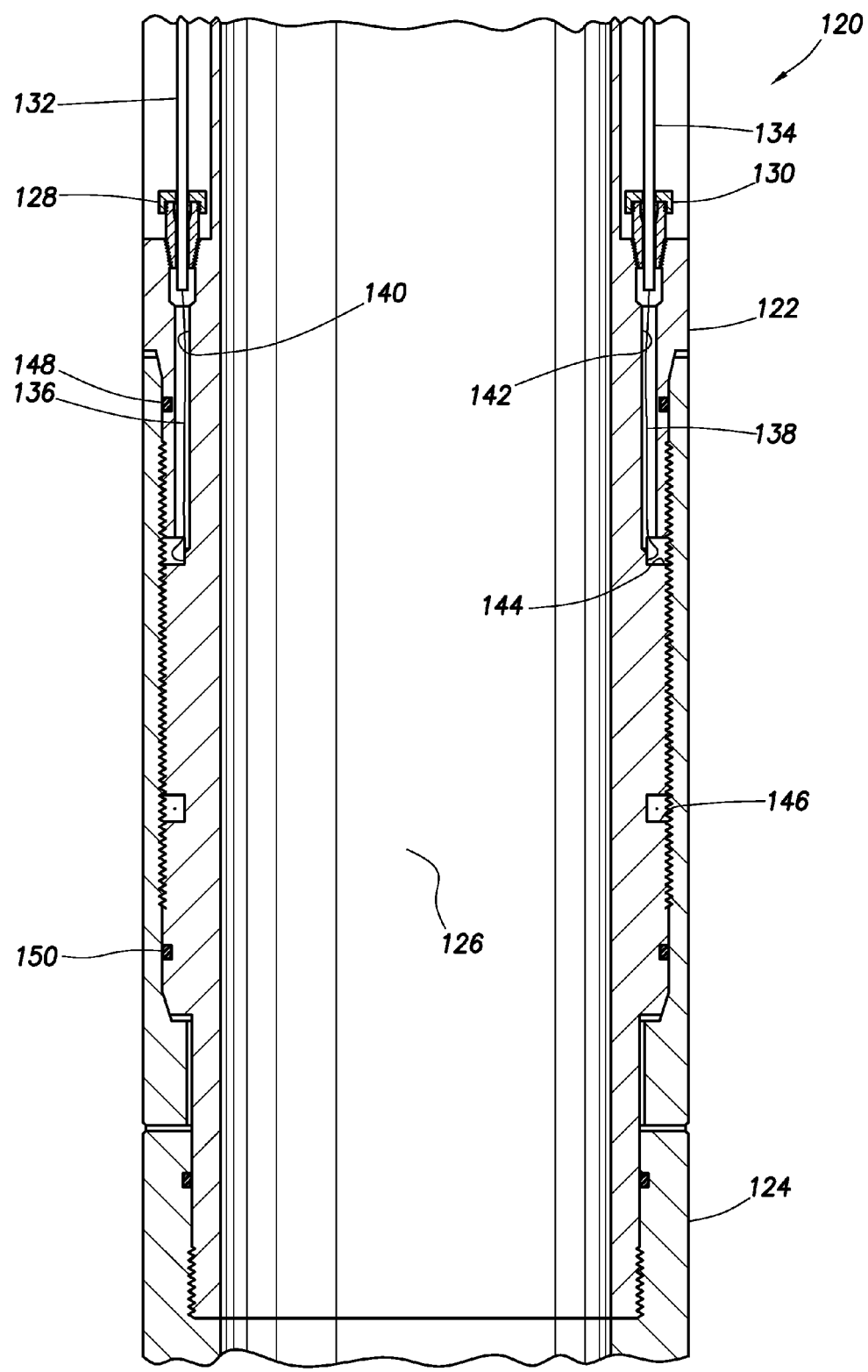
FIG. 7 is a schematic cross-sectional view of a fiber storage apparatus embodying principles of the invention.

Referring additionally now to FIG. 7, a fiber storage apparatus 120 is representatively illustrated. In situations where a connection is made between optical fibers used downhole, it may be desirable to store a substantial length of optical fiber. For example, in a distributed temperature sensing system, the temperature of approximately 1 meter of optical fiber might not be effectively sensed beyond a fusion splice connection, and the temperature of at least approximately 10 meters of optical fiber might not be effectively sensed beyond a dry mate connection.

Thus, it would be beneficial to be able to store at least one meter, and preferably 10-50 meters or more, of optical fiber beyond an optical connection in a distributed temperature sensing system. In such a system, it would be desirable to store the substantial length of optical fiber after the optical connection in the fiber without causing any sharp radius bends in the fiber, which might lead to premature failure of the fiber. Note that the fiber storage apparatus 120 could be used in applications other than distributed temperature sensing systems, in keeping with the principles of the invention.

The fiber storage apparatus 120 includes a generally tubular body 122 and a generally tubular outer housing 124. The body 122 and housing 124 are configured for interconnection in a tubular string, such as the tubular string 14 described above, so that a flow passage 126 of the tubular string extends through the body and housing. Any type of tubular string could be used with the apparatus 120 (such as production tubing, casing, liner or coiled tubing strings, etc.), but it is not necessary for the body 122 and housing 124 to be interconnected in a tubular string in keeping with the principles of the invention.

The body 122 has gripping and sealing devices 128, 130 installed at an upper end thereof for attaching conduit sections 132, 134 to the body. The devices 128, 130 could be similar to, or the same as, the devices 42, 44 described above. The conduit sections 132, 134 could be similar to, or the same as, the conduit sections 20, 22 described above.

An optical fiber section 136 extends through the conduit section 132 and into the body 122 via a passage 140. Another optical fiber section 138 extends through the conduit section 134 and into the body 122 via another passage 142. The optical fiber sections 136, 138 may be separate sections of an optical fiber which are connected via a fusion splice connection (such as the fusion splices 36, 58 described above) or a dry mate connection (such as the connection 70 described above), or the optical fiber sections could be connected in another manner. Alternatively, the optical fiber sections 136, 138 could be the same, i.e., a continuous length of optical fiber, instead of being separate sections of an optical fiber.

If the optical fiber sections 136, 138 are separate connected sections of an optical fiber, then the connection between the optical fiber sections may be contained within the storage apparatus 120, as described below. However, it should be understood that it is not necessary for any connection between the optical fiber sections 136, 138, if any, to be contained within the storage apparatus 120 in keeping with the principles of the invention.

Each of the passages 140, 142 intersects an annular circumferentially extending recess 144 formed externally on the body 122. Another similarly configured recess 146 is formed on the body 122 spaced apart from the recess 144. Prior to installing the housing 124 on the body 122 as depicted in FIG. 7, the optical fiber sections 136, 138 are wound about the body in the recesses 144, 146 to thereby store a substantial length of optical fiber in the recesses. The housing 124 is then installed over the recesses 144, 146 and sealed to the body 122 above and below the recesses, preferably using one or more metal-to-metal seals and/or elastomeric or non-elastomeric seals 148, 150. Preferably, the optical fiber sections 136, 138 and the interior of the apparatus 120 are thus maintained at atmospheric pressure when the apparatus is installed in a well.

Figure 8:
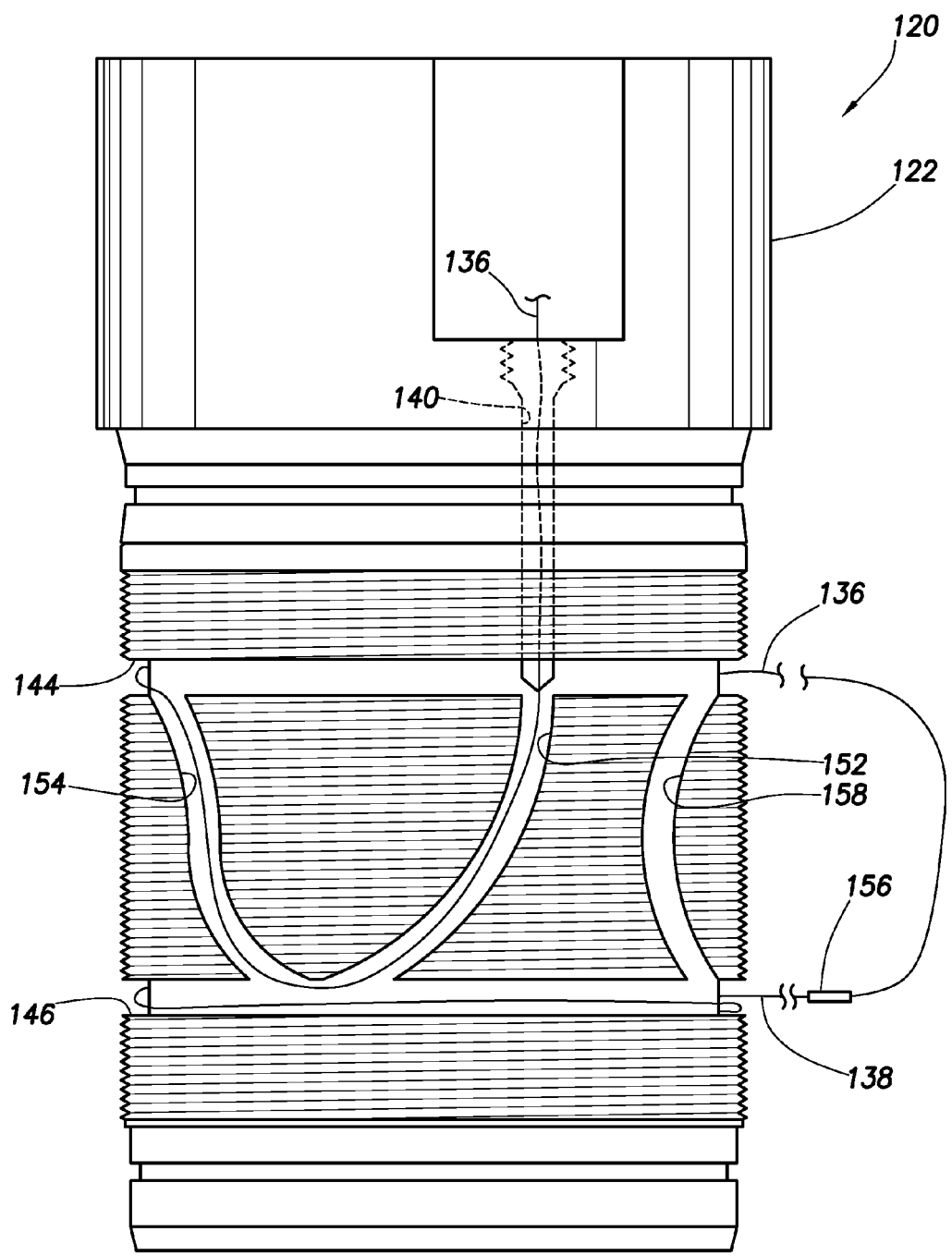
FIG. 8 is an elevational view of a body of the system of FIG. 7.

Referring additionally to FIG. 8, a manner in which the optical fiber sections 136, 138 may be wound about the body 122 is representatively illustrated. In FIG. 8, the body 122 and optical fiber sections 136, 138 are shown apart from the remainder of the apparatus 120 for illustrative clarity. The body 122 is also rotated somewhat about its vertical axis, so that the manner in which the optical fiber section 136 extends through the passage 140 and recesses 144, 146 can be clearly viewed.

Note that the optical fiber section 136 extends downwardly through the passage 140 to the recess 144. The optical fiber section 136 then extends in another curved recess 152 which interconnects the recesses 144, 146. The optical fiber section 136 extends only briefly in the recess 146 before extending in another curved recess 154 which also interconnects the recesses 144, 146. The recess 154 permits the optical fiber section 136 to extend back up to the recess 144.

In this manner, the optical fiber section 136 is directed through the passage 140 and recesses 152, 146, 154 to the recess 144. The optical fiber section 136 is thus received in the upper recess 144 without making any sharp radius bends which might break, otherwise damage or cause long term reliability problems. The other optical fiber section 138 is similarly directed through the passage 142 and another curved recess (similar to the recess 152) to the lower recess 146 without making any sharp radius bends.

With the optical fiber section 136 received in the upper recess 144 and the optical fiber section 138 received in the lower recess 146, the optical fiber sections can now be simultaneously wound multiple times about the body, thereby storing multiple wraps of the optical fiber section 136 in the upper recess 144, and multiple wraps of the optical fiber section 138 in the lower recess 146. Thus, this configuration of the body 122 permits a substantial length of the optical fiber sections 136, 138 to be stored in the apparatus 120.

An equal or greater length of either of the optical fiber sections 136, 138 relative to the other of the optical fiber sections could be stored in the apparatus 120 in keeping with the principles of the invention. As depicted in FIG. 8, a greater length of the optical fiber section 136 is wrapped about the body 122 as compared to the length of the optical fiber section 138.

An optical connection 156, such as a fusion splice, between the optical fiber sections 136, 138 is received in the lower recess 146. At the completion of the process of wrapping the optical fiber sections 136, 138 about the body 122, the optical fiber section 136 is received in another curved recess 158 interconnecting the upper and lower recesses 144, 146. If the lengths of the optical fiber sections 136, 138 wrapped about the body 122 were approximately equal, then the connection 156 could be received in the recess 158.

Although the apparatus 120 has been illustrated as including the body 122 on which the optical fiber sections 136 are externally wrapped, and the housing 124 which outwardly contains and protects the optical fiber sections received in the external recesses 144, 146, 152, 154, 158 formed on the body, it should be clearly understood that many other configurations are possible in keeping with the principles of the invention. For example, the optical fiber sections 136, 138 could be received internally on the body 122 (in which case the housing 124 could inwardly contain and protect the optical fiber sections), or the optical fiber sections could be received in a sidewall of the body (in which case a separate protective housing may not be used), etc. It is also not necessary for the devices 128, 130 and passages 140, 142 to be positioned at one end of the body 122. One of the devices 128, 130 and the respective one of the passages 140, 142 could instead be positioned at an opposite end of the body 122.

Furthermore, additional optical fibers and/or optical fiber sections could be received or stored in a single storage apparatus 120. For example, if the optical fiber sections 136, 138 are part of a distributed temperature sensing system, then they may be of the type known to those skilled in the art as multi-mode optical fibers. It may be beneficial to also position an optical fiber of the type known to those skilled in the art as a single mode optical fiber in the apparatus 120 to provide an independent temperature sensing capability, to provide information for calibrating the distributed temperature sensing system, or for other purposes. Thus, multiple single mode and/or multi-mode optical fibers, and any combination of these, may be received in the storage apparatus 120 in keeping with the principles of the invention.

Figure 9:
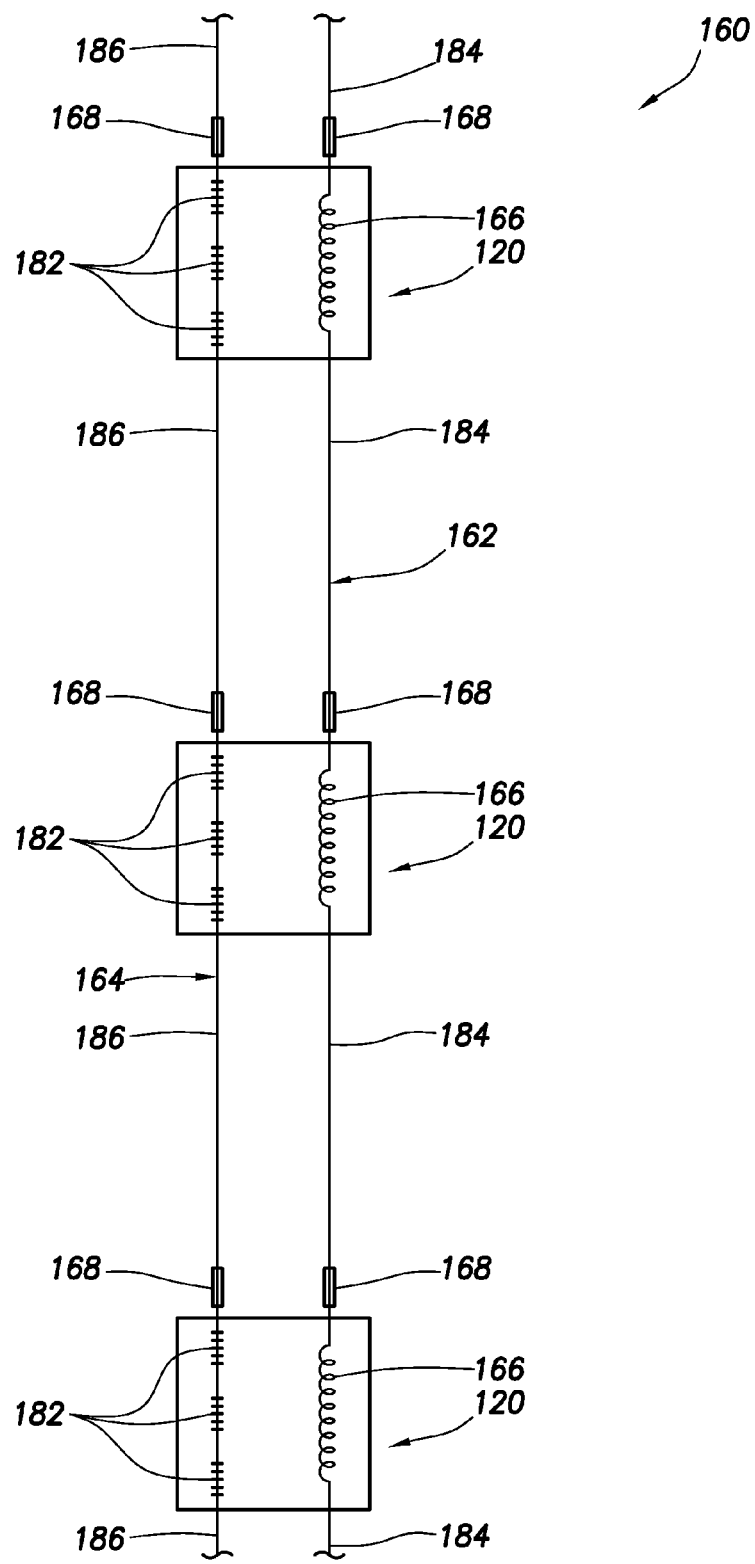
FIG. 9 is a schematic view of a fiber optic calibration system embodying principles of the invention.

Referring additionally now to FIG. 9, a schematic depiction of a method of calibrating an optical distributed temperature sensing system 160 is representatively illustrated. The temperature sensing system 160 includes multiple storage apparatuses 120. Each of the storage apparatuses 120 has a substantial length 166 of a multi-mode optical fiber 162 stored therein. Also received in each storage apparatus 120 is a single mode optical fiber 164.

The optical fiber 162 may comprise multiple optical fiber sections 184, and the optical fiber 164 may comprise multiple optical fiber sections 186. Alternatively, the optical fibers 162, 164 could each be a single length of optical fiber, without being divided into sections.

The substantial lengths 166 of the optical fiber 162 are each located below a respective one of multiple optical connections 168 interconnecting the sections 184. As discussed above, an optical distributed temperature sensing system is effectively "blinded" for a substantial length beyond an optical connection. Thus, by compactly storing the substantial lengths 166 of the optical fiber 162 below each connection 168 in the storage apparatuses 120, this blinding of the system 160 below each connection does not significantly compromise the ability of the system to detect temperature along an interval below the connection.

However, it should be understood that the apparatuses 120 can be used whether or not the connections 168 are formed in the optical fiber 162. There are other reasons why it may be beneficial to store the substantial lengths 166 of the optical fiber 162 in the system 160, or in systems other than optical distributed temperature sensing systems. For example, the compact storage of a substantial length of the optical fiber 162 can provide valuable information for calibrating an optical distributed temperature sensing system.

Figure 10:
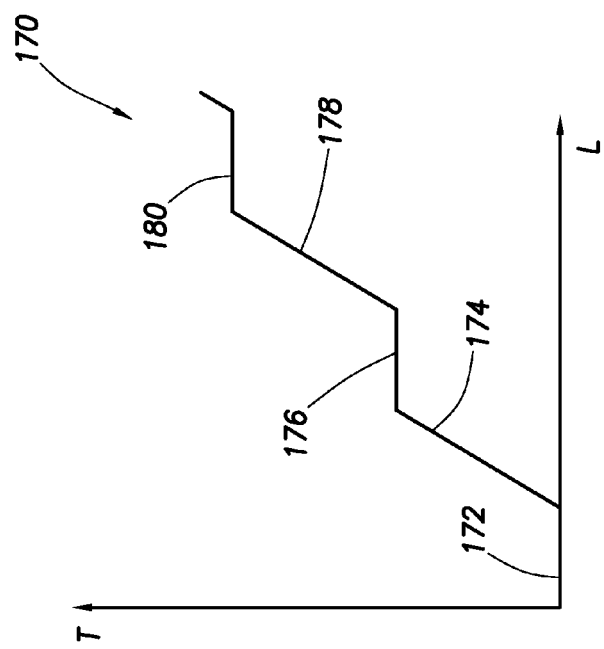
FIG. 10 is a graph of temperature versus length along fiber for the calibration system of FIG. 9.

In the system 160, a parameter known to those skilled in the art as a differential attenuation value used in calculating temperature along the optical fiber 162 may be accurately adjusted using the substantial lengths 166 of the optical fiber stored in the storage apparatuses 120, so that the system is more precisely calibrated. Referring additionally now to FIG. 10, an idealized graph of temperature (T) versus length (L) along the optical fiber 162 for the system 160 of FIG. 9 is representatively illustrated.

In this idealized graph 170, for clarity it is assumed that the connections 168 are not present in the optical fiber 162, and the upper storage apparatus 120 is located at the surface at the beginning of the optical fiber. Surface temperature is at T=0. A horizontal line 172 extends from the origin (L=0, T=0) on the graph 170, indicating that the temperature of the entire substantial length 166 of the optical fiber 162 in the storage apparatus 120 at the surface is the same.

A positively sloped line 174 indicates that the temperature of the optical fiber 162 increases gradually between the storage apparatus 120 at the surface and the next deeper storage apparatus. Another horizontal line 176 indicates that the temperature of the entire substantial length 166 of the optical fiber 162 in the storage apparatus 120 below the surface storage apparatus is at a same temperature.

Another positively sloped line 178 on the graph 170 again indicates that the temperature of the optical fiber 162 increases gradually between the two storage apparatuses 120 below the surface storage apparatus. Yet another horizontal line 180 indicates that the entire substantial length of the optical fiber 162 in the deepest storage apparatus 120 is at a same temperature.

If one of the horizontal lines 172, 176, 180 is not horizontal in actual practice, then this is an indication that the differential attenuation value used to calculate temperature along the length of the optical fiber 162 in the system 160 is in error and should be adjusted. When the differential attenuation value used in the system 160 is properly adjusted, the lines 172, 176, 180 should be horizontal, since the entire substantial lengths 166 of the optical fiber 162 in the storage apparatuses 120 should be at respective same temperatures in the well.

In the past, the differential attenuation value used in an optical differential temperature sensing system was based on experience, empirical testing of an optical fiber, etc. In contrast, the system 160 allows the differential attenuation value to be directly evaluated for accuracy in each particular installation. Furthermore, since the differential attenuation value can be evaluated for accuracy at multiple locations in a well (i.e., by using multiple storage apparatuses 120), adjustments in the differential attenuation value may be made for different portions of the optical fiber 162. For example, in the system 160, a first differential attenuation value may be used for the optical fiber 162 near the storage apparatus 120 at the surface, a second differential attenuation value may be used for the optical fiber to either side of the next deeper storage apparatus, and a third differential attenuation value may be used for the optical fiber to either side of the deepest storage apparatus. By using separately adjusted differential attenuation values in the system 160 for respective separate lengths of the optical fiber 162, each of the lines 172, 176, 180 on the graph 170 can be independently made horizontal.

The single mode optical fiber 164 can have independent temperature sensing elements 182 located in each of the storage apparatuses 120. One or more temperature sensing elements 182 could be located in each storage apparatus 120. By positioning the elements 182 in the apparatuses 120, they will preferably be at the same temperature as the respective substantial lengths 166 of the optical fiber 162. The elements 182 are schematically illustrated in FIG. 9 as being fiber Bragg gratings, but any other type of temperature sensing elements may be used, such as interferometric temperature sensors, etc.

The independent temperature indications provided by the elements 182 can be used to calibrate the system 160 so that the horizontal lines 172, 176, 180 occur at the respective appropriate temperatures on the graph 170 (i.e., at the temperatures indicated by the respective elements 182). The differential attenuation value adjustments described above should also position each of the lines 172, 176, 180 so that they each indicate the same temperature as indicated by the respective temperature sensing elements 182.

If the connections 168 are used in the optical fiber 162, then the graph 170 will also show that the system 160 is effectively blinded for a substantial length beyond each connection. For this reason, each storage apparatus 120 may have stored therein substantially more than the length of the optical fiber 162 for which the system 160 is blinded, so that the enhanced calibration benefits described above may also be realized.

Although the elements 182 have been described above as being positioned in the storage apparatuses 120, and as being formed on the optical fiber 164, other configurations and other types of temperature sensing elements may be used without departing from the principles of the invention. For example, the elements 182 could be positioned internal or external to the apparatuses 120. The elements 182 could be optical, electrical, mechanical or other types of temperature sensing devices. Preferably, however, the elements 182 provide an indication of temperature which is independent of the distributed temperature sensing which is performed using the optical fiber 162.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A method of calibrating an optical distributed temperature sensing system for differential attenuation, the method comprising the steps of:
    positioning a first optical fiber in a wellbore; and
    storing a substantial length of the first optical fiber in a storage apparatus in the well, so that the substantial length of the first optical fiber is at a same temperature in the storage apparatus.

2. The method of claim 1, further comprising the step of calibrating the distributed temperature sensing system, so that a temperature of the entire substantial length of the first optical fiber indicated by the distributed temperature sensing system is the same.

3. The method of claim 2, wherein the calibrating step further comprises adjusting a differential attenuation value of the distributed temperature sensing system, so that the temperature of the entire substantial length of the first optical fiber indicated by the distributed temperature sensing system is the same.

4. The method of claim 1, wherein the storing step further comprises storing multiple substantial lengths of the first optical fiber in respective multiple spaced apart storage apparatuses in the well.

5. The method of claim 4, further comprising the step of calibrating the distributed temperature sensing system, so that a temperature of each entire substantial length of the first optical fiber indicated by the distributed temperature system is the same.

6. The method of claim 5, wherein the calibrating step further comprises adjusting multiple differential attenuation values of the distributed temperature system, so that the temperature of each entire substantial length of the first optical fiber indicated by the distributed temperature system is the same.

7. The method of claim 4, further comprising the step of disposing multiple temperature sensing elements in the respective storage apparatuses.

8. The method of claim 7, further comprising the step of calibrating the distributed temperature sensing system, so that a temperature of each substantial length of the first optical fiber indicated by the distributed temperature sensing system is the same as a temperature indicated by the respective one of the temperature sensing elements.

9. The method of claim 8, wherein the calibrating step further comprises adjusting multiple differential attenuation values of the distributed temperature sensing system, so that the temperature of each entire substantial length of the first optical fiber indicated by the distributed temperature sensing system is the same as the temperature indicated by the respective one of the temperature sensing elements.

10. The method of claim 1, further comprising the step of disposing a temperature sensing element in the storage apparatus, so that the temperature sensing element is at the same temperature in the well as the substantial length of the first optical fiber.

11. The method of claim 10, wherein the disposing step further comprises associating the temperature sensing element with a second optical fiber in the storage apparatus.

12. The method of claim 11, further comprising the step of forming the temperature sensing element as a fiber Bragg grating on the second optical fiber.

13. The method of claim 11, wherein in the disposing step, the temperature sensing element is an interferometric temperature sensor.

14. The method of claim 10, further comprising the step of calibrating the distributed temperature sensing system, so that a temperature of the substantial length of the first optical fiber indicated by the distributed temperature sensing system is the same as a temperature indicated by the temperature sensing element.

15. The method of claim 14, wherein the calibrating step further comprises adjusting a differential attenuation value of the distributed temperature sensing system, so that the temperature of the entire substantial length of the first optical fiber indicated by the distributed temperature sensing system is the same as the temperature indicated by the temperature sensing element.

16. The method of claim 1, wherein in the positioning step, the first optical fiber comprises a multi-mode optical fiber.

* * * * *